United States Patent
Zaki et al.

(10) Patent No.: US 7,525,915 B2
(45) Date of Patent: Apr. 28, 2009

(54) QUALITY OF SERVICE MANAGEMENT FOR A WIRELESS LOCAL AREA NETWORK

(75) Inventors: Maged Zaki, Pierrefonds (CA); Teresa Joanne Hunkeler, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 542 days.

(21) Appl. No.: 10/981,002

(22) Filed: Nov. 4, 2004

(65) Prior Publication Data

US 2005/0147041 A1 Jul. 7, 2005

Related U.S. Application Data

(60) Provisional application No. 60/517,695, filed on Nov. 5, 2003.

(51) Int. Cl.
H04L 12/26 (2006.01)
(52) U.S. Cl. .................. 370/235; 370/338; 370/230
(58) Field of Classification Search .............. 370/235, 370/230, 338
See application file for complete search history.

(56) References Cited

U.S. PATENT DOCUMENTS

| | | | |
|---|---|---|---|
| 5,982,748 A | 11/1999 | Yin et al. | |
| 6,594,277 B1 | 7/2003 | Chiang et al. | |
| 6,999,416 B2 * | 2/2006 | Wang et al. | 370/230 |
| 7,061,935 B1 * | 6/2006 | Roy et al. | 370/468 |
| 2001/0036157 A1 * | 11/2001 | Blanc et al. | 370/235 |
| 2003/0035371 A1 * | 2/2003 | Reed et al. | 370/230 |

OTHER PUBLICATIONS

Thomas, "802.11e Brings QoS to WLANs," http://www.nwfusion.com/news/tech/2003/0623techupdate.html, Jun. 23, 2003.
Chung et al., "Understanding the MAC Impact of 802.11e: Part 1," (Oct. 29, 2003), available at: http://www.commsdesign.com/design_corner/OEG20031029S0009 (last visited Jun. 17, 2008).
Chung et al., "Understanding the MAC Impact of 802.11e: Part 2," (Oct. 30, 2003), available at: http://www.commsdesign.com/design_corner/OEG20031030S0005 (last visited Jun. 17, 2008).
IEEE Standard for Information technology—Telecommunications and information exchange between systems—Local and metropolitan area networks—Specific requirements, Part 11: Wireless Medium Access Control (MAC) and Physical Layer (PHY) specifications: Amendment 7: Medium Access Control (MAC) Quality of Service (QoS) Enhancements, IEEE P802.11e/D11.0 (Oct. 2004).

(Continued)

*Primary Examiner*—Brian D Nguyen
(74) *Attorney, Agent, or Firm*—Volpe and Koenig, P.C.

(57) ABSTRACT

A method for managing quality of service (QoS) in a wireless local area network begins by receiving a traffic flow. The traffic flow is mapped to a traffic class (TC), based on QoS requirements of the traffic flow. A transmission budget of an access class (AC) is calculated, each AC including at least one TC. A determination is made whether the traffic flow can be admitted, by calculating whether the transmission budget can support the traffic flow. If the traffic flow is admitted, the parameters of the TC are adjusted and collisions in the TC between existing traffic flows and the newly admitted traffic flow are managed.

5 Claims, 4 Drawing Sheets

OTHER PUBLICATIONS

Draft supplement to Standard for Telecommunications and Information Exchange Between Systems—LAN/MAN Specific requirements, Part 11: Wireless Medium Access Control (MAC) and Physical Layer (PHY) specifications: Medium Access Control (MAC) Enhancements for Quality of Service (QoS), IEEE Std. 802.11e/D4.4 (Jun. 2003).

Ohtani, "Wireless LAN Standard IEEE 802.11e Achieving QoS," The Journal of the Institute of Image Information and Television Engineers, vol. 57, No. 11, pp. 1459-1464 (Nov. 1, 2003).

Thomas, "802.11e Brings QoS to WLANs," http://www.nwfusion.com/news/tech/2003/0623techupdate.html, Jun. 23, 2003.

* cited by examiner

QUALITY OF SERVICE MANAGEMENT FOR A WIRELESS LOCAL AREA NETWORK

CROSS REFERENCE TO RELATED APPLICATION(S)

This application claims the benefit of U.S. Provisional Application No. 60/517,695, filed Nov. 5, 2003, which is incorporated by reference as if fully set forth herein.

FIELD OF INVENTION

The present invention relates to wireless local area networks (WLANs), and more particularly, to a method and system for managing quality of service (QoS) specifications in WLANs.

BACKGROUND

Wireless communication systems are well known in the art. Generally, such systems comprise communication stations, which transmit and receive wireless communication signals between each other. Depending upon the type of system, communication stations typically are one of two types: base stations or wireless transmit/receive units (WTRUs), which include mobile units.

The term base station as used herein includes, but is not limited to, a base station, a Node B, a site controller, an access point (AP), or other interfacing device in a wireless environment that provides WTRUs with wireless access to a network with which the base station is associated. In a WLAN, an AP is the preferred device, and will be used herein to describe the present invention.

The term WTRU as used herein includes, but is not limited to, a user equipment, a mobile station, a fixed or mobile subscriber unit, a pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units. In a WLAN, a station (STA) is the preferred device, and will be used herein to describe the present invention.

A popular WLAN environment with one or more APs is built according to one of the IEEE 802.11 family of standards. The basic service set (BSS) is the basic building block of an 802.11 WLAN and consists of a plurality of STAs. A set of STAs which can talk to each other can form a BSS. Multiple BSSs are interconnected through an architectural component, called a distribution system (DS), to form an extended service set (ESS). An AP is a STA that provides access to the DS by providing DS services and generally allows concurrent access to the DS by multiple STAs.

Systems compliant with the 802.11a/b/g WLAN standards are in widespread use. Quality of Service (QoS) capable WLANs are also emerging. The QoS solutions/specifications vary between proprietary solutions and standardized solutions where even the standard solutions have two types of QoS schemes, namely: 802.11e enhanced distribution coordination function (EDCA) and 802.11e hybrid coordination function (HCCA) schemes.

The 802.11e QoS facility defines a new hybrid coordination function (HCF) used only in a QoS enhanced basic service set (QBSS). HCF has two modes of operation: HCF with contention operation (also known as EDCA) and HCF with polled access operation.

A basic concept utilized by these channel access functions is the transmission opportunity (TXOP). A TXOP is a point in time when a STA can begin transmitting frames for a given duration. During a TXOP, a STA can transmit as many frames as possible in the TXOP, which is set according to the traffic class (TC) associated with the data.

A key difference between EDCA and HCCA is in how admission control is handled. In EDCA, admission control is handled by a distributed admission control (DAC) function, which measures the utilization percentage of the medium for each TC. The unused percentage of the medium is known as the available transmission budget for the TC. As the transmission budget approaches zero, limitations are imposed on adding new traffic flows or modifying existing traffic flows.

In HCCA, a STA requests particular reservation parameters for each traffic flow, based on the TC of the traffic flow. The HCF can then reject, accept, or offer an alternative set of parameters to the requesting STA. While this is more robust than DAC, the traffic flows need to be properly scheduled.

SUMMARY

A method for managing quality of service (QoS) in a wireless local area network begins by receiving a traffic flow. The traffic flow is mapped to a traffic class (TC), based on QoS requirements of the traffic flow. A transmission budget of an access category (AC) is calculated, each AC including at least one TC. A determination is made whether the traffic flow can be admitted, by calculating whether the transmission budget can support the traffic flow. If the traffic flow is admitted, the parameters of the TC are adjusted and collisions in the TC between existing traffic flows and the newly admitted traffic flow are managed.

A method for managing quality of service in a wireless local area network begins by receiving a traffic stream request, including a traffic specification (TSPEC) containing parameters of the traffic stream. The parameters contained in the TSPEC are analyzed and a determination is made whether the traffic stream can be admitted. The traffic stream is admitted if it can be admitted without changing the parameters. The parameters are renegotiated if the traffic stream could be admitted by changing the parameters, and then the traffic stream is admitted with the renegotiated parameters. The traffic stream is rejected if it could not be admitted.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

Figure 1:
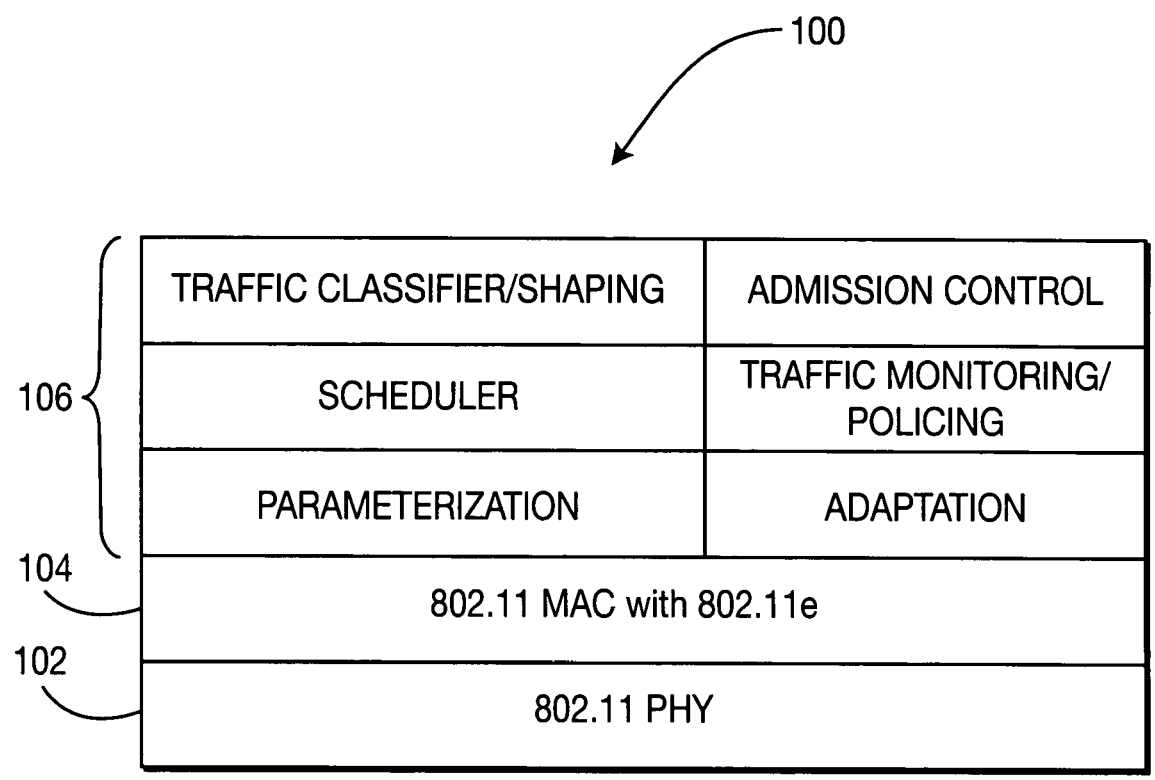
FIG. 1 is a block diagram of a QoS architecture in accordance with the present invention.

FIG. 1 shows a general QoS architecture 100. The architecture 100 is readily applicable to distributed coordination function (DCF), enhanced distributed coordination function (EDCA), or hybrid coordination function (HCF) controlled channel access (HCCA) schemes. The architecture 100 includes a physical layer 102, a medium access control (MAC) layer 104, and a network layer 106. The network layer 106 includes QoS procedures such as traffic classifier, traffic shaping, scheduler, parameterization, admission control, traffic monitoring/policing, and adaptation.

Figure 2:
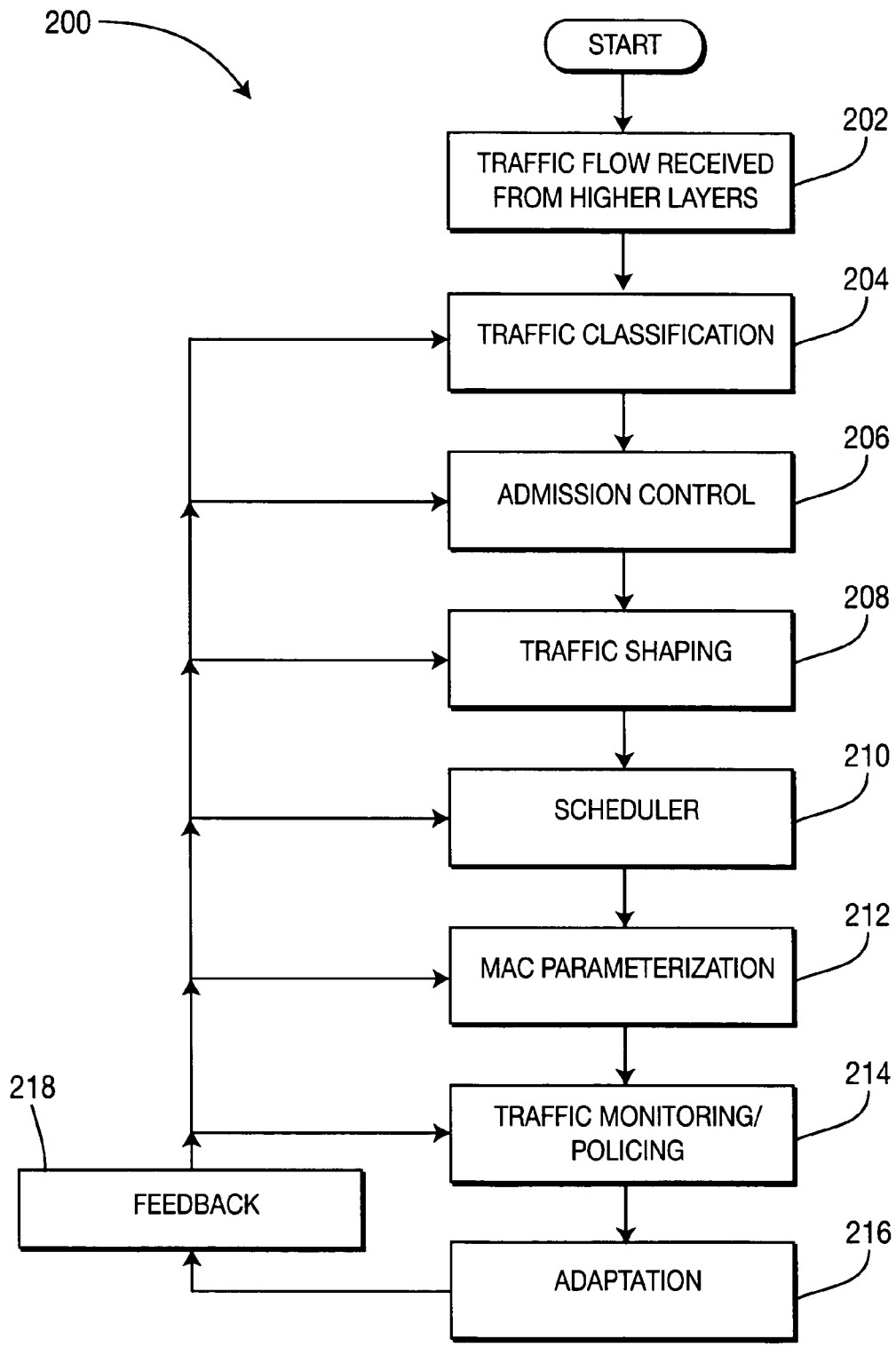
FIG. 2 is flowchart of a generic QoS procedure in accordance with the present invention.

FIG. 2 illustrates a generic QoS procedure 200 for processing communication data for transmission. A traffic flow (i.e., at least one data packet) is received from the higher layers (step 202). The traffic flow is classified into a traffic class (TC) according to the QoS requirements for the particular type of communication data received (step 204).

In admission control, applications request specific resources from the AP, such as bandwidth and latency. Depending on the QoS requirements, network load, wireless medium conditions, and traffic flows, these requests can be accepted or rejected by admission control (step 206).

Traffic shaping is used to control the traffic flow, so as to not overload the channel (step 208). During traffic shaping, the transmission of some data can be delayed and/or excess data can be dropped when a maximum data rate or amount is reached.

A scheduler determines when the data packets should be sent, by controlling the channel access of different traffic flows based on their priority and their QoS requirements (step 210).

A MAC parameterization process sets and dynamically adjusts the system parameters based on QoS requirements. These parameters are set for each TC and include a minimum contention window (CWmin) value, a maximum contention window (CWmax) value, arbitrary interframe space (AIFS) value, a persistence factor (PF) value, and TXOP value (step 212). In EDCA, the contention window (CW) is expanded by the PF value after a collision. The PF value will determine if the CW has to be doubled, tripled, etc. after a collision.

The data packets are monitored and policed to control the traffic flow (step 214). Upstream packet inter-arrival time (from the packet timestamp) and downstream packet inter-dispatch time are monitored. Feedback for each flow is provided, such as the number of deadlines missed (how many times the data was delayed longer than the allowed delay for a particular service type) and the delay variance (i.e., jitter).

Adjustments to the system settings are made to adapt to changing network conditions (step 216). During adaptation, depending on the feedback obtained from the traffic monitoring function, the scheduler: changes its schedule; renegotiates the contract with higher layers, in which the scheduler can request the higher layer to reduce traffic, provide less bandwidth for specific services, or admit fewer users; drops low priority traffic flows; or changes the parameters to adapt to the current situation.

A feedback function provides feedback generated by the adaptation function to the other functions (step 218).

DCF-Based QoS Procedures

The generic outline described in connection with FIG. 2 can be readily used for a DCF-based QoS algorithm and procedures. For the DCF case, all traffic flows can be assumed to be equal. In order to ensure fairness among the traffic flows, the relative number of downlink access opportunities per user can be controlled through scheduling. Different concepts of fairness may be applied. For instance, it is possible to attempt to ensure that all users have the same amount of downlink bandwidth, that all users have an equivalent goodput (throughput with retransmissions), or that all packets have a similar queuing delay.

Although uplink scheduling cannot be directly controlled, for TCP traffic it is possible for the AP to manipulate the uplink TCP ACKs prior to sending them to the distribution system. This allows some indirect control on the rate of uplink traffic an individual STA transmits.

DCF can also implement a packet-discard function in traffic shaping, which is preferably consistent with the scheduling policy (e.g., discard packets if user bandwidth is too high, if the packets have been queued too long, or randomly). The maximum downlink bandwidth of a user can be limited by reducing the MAC scheduling opportunities during times of congestion. Downlink scheduling can be prioritized based on controlling the queuing delay of packets.

Downlink bandwidth of users with high error rates can be limited. A link with high error rates means that there is a higher probability that the next transmission will be in error (wasting bandwidth). An error also means that the AP will have to increase its contention window, reducing access to the bandwidth.

During a DCF-based procedure, admission control is used to admit users depending on the available radio resources and link conditions. After users are admitted, traffic shaping can be used to handle an overload situation by delaying traffic or by dropping packets. The scheduler is used to select which user sends the next packet based on many criteria, including fairness.

EDCA-Based QoS Procedures

Figure 3:
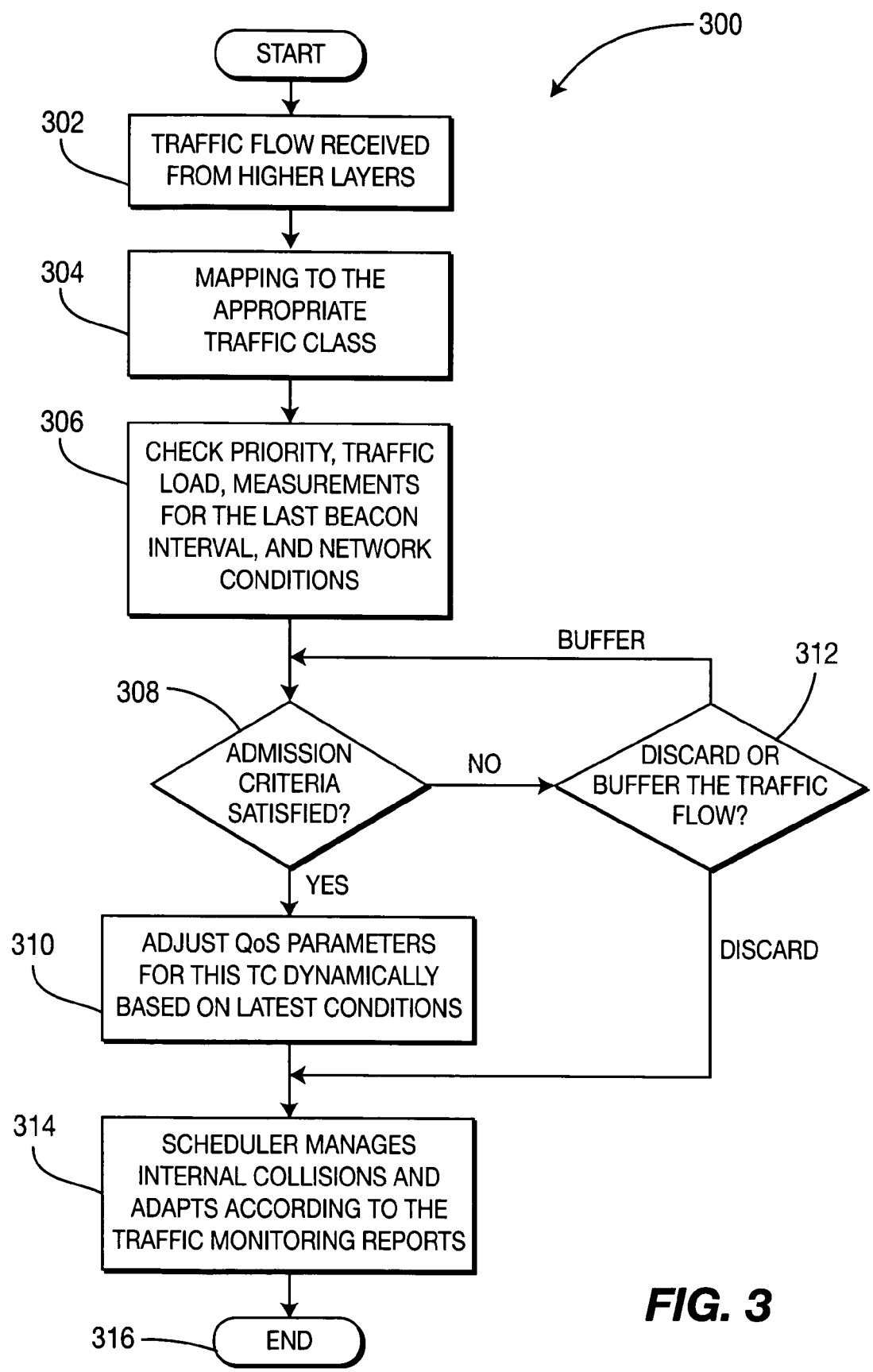
FIG. 3 is flowchart of an EDCA-based QoS scheme in accordance with the present invention.

FIG. 3 shows a high-level flowchart for an EDCA-based QoS procedure 300. A traffic flow (i.e., one or more data packets) is received from higher layers (step 302). The traffic flow is mapped to the appropriate traffic class (TC) based on its QoS requirements (step 304). Traffic flows are preferably mapped to different TCs dynamically based on the QoS requirements and previous observation windows for the network performance (i.e., channel quality and traffic load). The priority of each packet is checked, along with the current traffic load in the system, measurements for the last beacon interval, and network conditions (step 306).

The purpose of QoS is to separate high-priority traffic from low-priority traffic. In a WLAN, it can be necessary to separate one high-priority traffic flow from another high-priority traffic flow in order to avoid overloading the medium. Admission control is used for this purpose by monitoring the available resources of the WLAN and making a determination whether to admit a new traffic flow.

In admission control (DAC with EDCA), a transmission budget is defined for each access category (AC); each TC maps to an AC and an AC can include more than one TC. This scheme considers the delay and latency requirements for each class of QoS requirements (defined per AC) and the transmission budget is adapted according to observed measurements for a previous observation window, such as the number of deadlines missed, throughput, and delay variance. The transmission budget is also adjusted according to the feedback from the traffic monitoring/policing functions.

To determine if a traffic flow satisfies the admission criteria (step 308), the transmission budget is evaluated. A traffic flow will only be admitted if there are sufficient resources (i.e., if the transmission budget is large enough to support the traffic flow). The transmission budget per AC is equal to the maximum allowed transmission budget for the AC minus the transmission budget already used by the AC.

If the admission criteria are satisfied (step 308), then the parameters for the current traffic class are dynamically adjusted based on the latest conditions and observed measurements (step 310). If the admission criteria are not satisfied, then the traffic flow is discarded or buffered (step 312).

Whether the traffic flow will be discarded or buffered is based on its priority (e.g., the type or class of service). Higher priority traffic flows are buffered, while lower priority traffic flows are discarded. For example, if the traffic flow relates to emergency services data, it will be buffered, whereas if the traffic flow relates to normal background data, such as FTP data, the traffic flow will be discarded. If the traffic flow is buffered, then the procedure 300 continues with step 308 as described above.

After the current traffic flow is admitted or discarded, the scheduler manages internal data collisions based on the priority of each traffic flow and dynamically adjusts the parameters for each TC according to the traffic monitoring reports (step 314). The procedure then terminates (step 316).

HCF Controlled Channel Access-Based QoS Procedures (HCCA)

Figure 4:
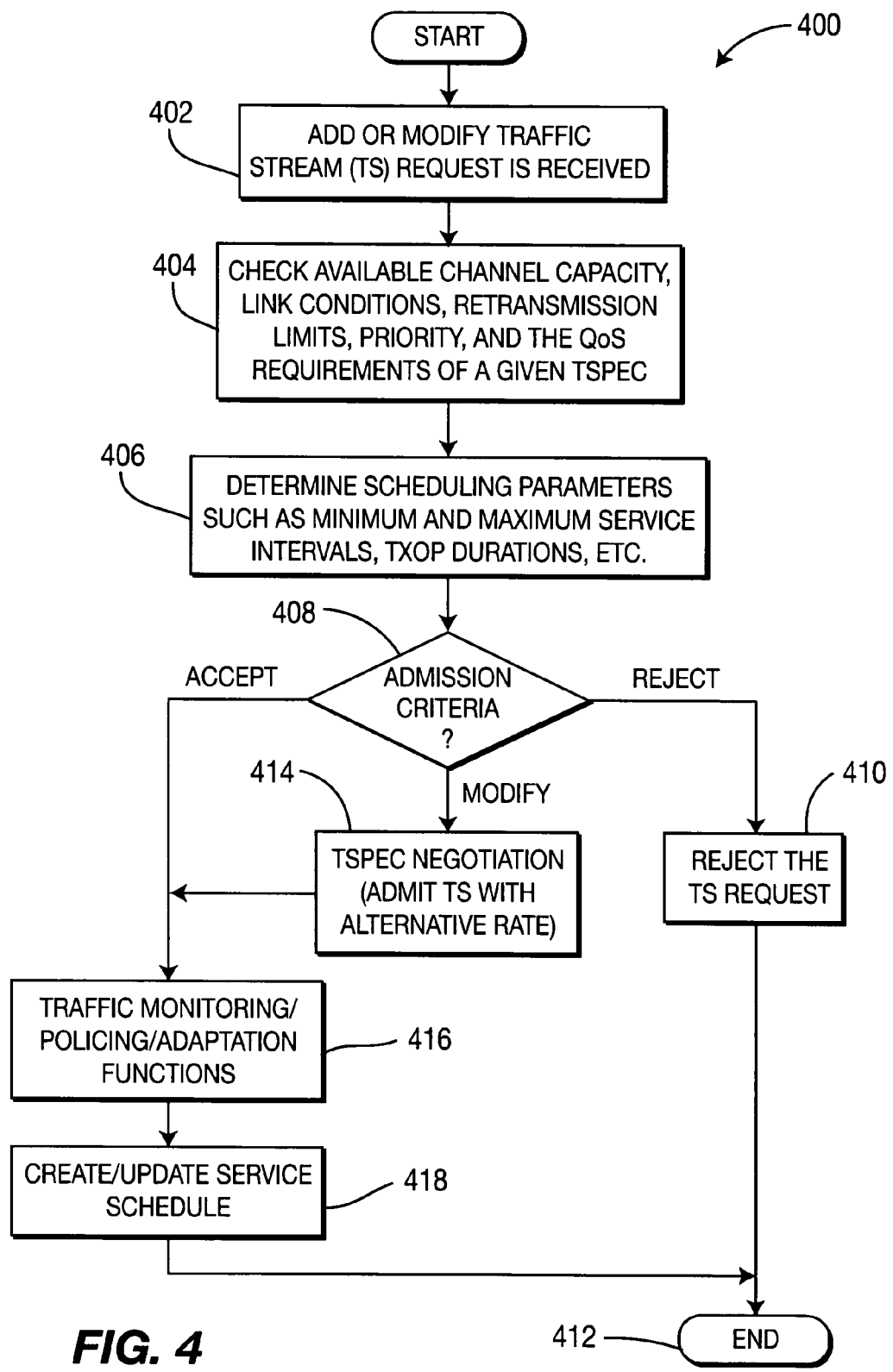
FIG. 4 is flowchart of an HCF controlled channel access-based QoS scheme in accordance with the present invention.

FIG. 4 shows an HCF controlled channel access (HCCA)-based QoS procedure 400. The procedure 400 begins by receiving a request to add or modify a traffic stream (step 402). The request includes reservation parameters for the traffic stream in a TSPEC associated with the traffic stream. The available channel capacity, link conditions, retransmission limits, priority, and QoS requirements of the TSPEC are checked (step 404). Scheduling parameters, such as minimum and maximum service intervals and TXOP durations, are determined (step 406). A determination is then made whether the traffic stream can be admitted at the required rate and delay bounds (step 408). From the TSPEC parameters, the traffic stream requirements are compared with the available transmission budget. If the time needed to send the traffic stream during the beacon period is less than the available time required to meet the QoS requirements of the traffic stream (i.e., if the transmission budget is large enough to accommodate the traffic stream), then the added traffic stream will be admitted.

If the traffic stream can not be admitted, then the traffic stream request is rejected (step 410) and the procedure terminates (step 412).

If the traffic stream could be partially admitted with lower requirements (step 408), then the TSPEC is modified by renegotiating with higher layers, which generally indicates that the traffic stream will be admitted with an alternate data rate (step 414). While it is possible to renegotiate other parameters with higher layers, the data rate is most frequently adjusted, to reduce the bandwidth allocated for a traffic stream.

If the traffic stream meets the admission criteria (step 408), then the traffic stream is admitted and the traffic monitoring/policing and adaptation functions are invoked to provide feedback to the scheduler about the system performance and can drop violating traffic streams (step 416). A violating traffic stream can result from: (1) too many re-transmissions, which can waste the medium time; or (2) higher layer applications sending more than the expected level of traffic, which can cause congestion. In the latter case, lower priority traffic streams can be dropped to alleviate the congestion.

A service schedule is created or updated (step 418) and the procedure terminates (step 412). A service schedule directs how traffic is scheduled during each beacon period, including which traffic streams will be sent during the beacon period. The service schedule is preferably adapted based on the feedback from the traffic monitoring and the observed measurements for previous observation window.

The foregoing description makes references to 802.11-type systems as an example only and not as a limitation. Other variations and modifications consistent with the invention will be recognized by those of ordinary skill in the art.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for managing quality of service (QoS) in a wireless local area network, comprising:
   receiving a traffic flow comprising at least one data packet;
   mapping the traffic flow to a traffic class (TC), based on QoS requirements of the traffic flow;
   calculating a transmission budget of an access category (AC), each AC including at least one TC;
   determining whether the traffic flow can be admitted, by calculating whether the transmission budget can support the traffic flow;
   adjusting parameters of the TC if the traffic flow is admitted; and
   managing collisions within the TC between existing traffic flows and the determined admitted traffic flow.

2. The method according to claim 1, wherein the transmission budget is equal to a maximum allowed transmission budget for an AC minus the transmission budget already used by the AC.

3. The method according to claim 1, further comprising:
   determining a priority of the traffic flow.

4. The method according to claim 3, wherein if the traffic flow is not admitted, then discarding the traffic flow if its priority is low.

5. The method according to claim 3, wherein if the traffic flow is not admitted, then buffering the traffic flow if its priority is high.

* * * * *

UNITED STATES PATENT AND TRADEMARK OFFICE
CERTIFICATE OF CORRECTION

PATENT NO. : 7,525,915 B2 Page 1 of 1
APPLICATION NO. : 10/981002
DATED : April 28, 2009
INVENTOR(S) : Zaki et al.

It is certified that error appears in the above-identified patent and that said Letters Patent is hereby corrected as shown below:

At claim 1, column 6, line 28, after the word "packet" insert
--at a communication station in the wireless local area network;--.

Signed and Sealed this

Thirtieth Day of June, 2009

JOHN DOLL
*Acting Director of the United States Patent and Trademark Office*